(12) United States Patent
Tang et al.

(10) Patent No.: US 9,286,927 B1
(45) Date of Patent: Mar. 15, 2016

(54) DATA STORAGE DEVICE DEMODULATING SERVO BURST BY COMPUTING SLOPE OF INTERMEDIATE INTEGRATION POINTS

(71) Applicant: Western Digital Technologies, Inc., Irvine, CA (US)

(72) Inventors: Shan Tang, Irvine, CA (US); Zhenyu Zhang, Irvine, CA (US); Chuanwen Ji, Irvine, CA (US); Duc T. Phan, Saratoga, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/571,461

(22) Filed: Dec. 16, 2014

(51) Int. Cl.
*G11B 5/596* (2006.01)
*G11B 20/00* (2006.01)
(52) U.S. Cl.
CPC ........ *G11B 5/59655* (2013.01); *G11B 5/59688* (2013.01); *G11B 20/00963* (2013.01)
(58) Field of Classification Search
CPC ........... G11B 5/5965; G11B 11/10578; G11B 19/06; G11B 20/00963; G11B 2020/1476; G11B 5/59688
USPC ........................... 360/75, 77.08, 77.05, 31, 39
See application file for complete search history.

(56) References Cited

U.S. PATENT DOCUMENTS

| 4,412,165 A * | 10/1983 | Case ................. | G11B 5/59633 318/636 |
| 5,381,281 A * | 1/1995 | Shrinkle .............. | G11B 21/106 360/77.08 |
| 5,602,692 A * | 2/1997 | Freitas ............... | G11B 5/59616 360/77.02 |
| 5,798,883 A * | 8/1998 | Kim ................... | G11B 20/1879 360/31 |
| 5,946,158 A | 8/1999 | Nazarian et al. | |
| 5,982,173 A | 11/1999 | Hagen | |
| 6,014,283 A | 1/2000 | Codilian et al. | |
| 6,052,076 A | 4/2000 | Patton, III et al. | |
| 6,052,250 A | 4/2000 | Golowka et al. | |
| 6,067,206 A | 5/2000 | Hull et al. | |
| 6,078,453 A | 6/2000 | Dziallo et al. | |
| 6,091,564 A | 7/2000 | Codilian et al. | |
| 6,094,020 A | 7/2000 | Goretzki et al. | |
| 6,101,065 A | 8/2000 | Alfred et al. | |
| 6,104,153 A | 8/2000 | Codilian et al. | |

(Continued)

OTHER PUBLICATIONS

IBM Technical Disclosure Bulletin, Jun. 1977, US Servo Error Detection using Pointers. Jun. 1977 TDB-ACC-No. NN770638.*

*Primary Examiner* — Thomas Alunkal

(57) ABSTRACT

A data storage device is disclosed comprising a head actuated over a disk surface comprising tracks defined by servo sectors, wherein each servo sector comprises at least one servo burst comprising a periodic pattern. The servo burst of one of the servo sectors is read to generate a read signal, and M intermediate integration points $y_{N_i}$ are computed according to:

$$y_{N_i} = \sum_{k=0}^{N_i} r(kT_s) \cdot \sin(\omega k T_s); \ i = 0, 1, \ldots, M-1$$

where $r(kT_s)$ represents a sample point of the read signal, $T_s$ represents a sample interval between the sample points, and $\omega$ represents a frequency of the periodic pattern in the servo burst.

22 Claims, 4 Drawing Sheets

(56) References Cited

U.S. PATENT DOCUMENTS

| | | | |
|---|---|---|---|
| 6,122,133 A | 9/2000 | Nazarian et al. |
| 6,122,135 A | 9/2000 | Stich |
| 6,141,175 A | 10/2000 | Nazarian et al. |
| 6,160,368 A | 12/2000 | Plutowski |
| 6,181,502 B1 | 1/2001 | Hussein et al. |
| 6,195,222 B1 | 2/2001 | Heminger et al. |
| 6,198,584 B1 | 3/2001 | Codilian et al. |
| 6,198,590 B1 | 3/2001 | Codilian et al. |
| 6,204,988 B1 | 3/2001 | Codilian et al. |
| 6,243,223 B1 | 6/2001 | Elliott et al. |
| 6,281,652 B1 | 8/2001 | Ryan et al. |
| 6,285,521 B1 | 9/2001 | Hussein |
| 6,292,320 B1 | 9/2001 | Mason et al. |
| 6,310,742 B1 | 10/2001 | Nazarian et al. |
| 6,320,718 B1 | 11/2001 | Bouwkamp et al. |
| 6,342,984 B1 | 1/2002 | Hussein et al. |
| 6,347,018 B1 | 2/2002 | Kadlec et al. |
| 6,369,972 B1 | 4/2002 | Codilian et al. |
| 6,369,974 B1 | 4/2002 | Asgari et al. |
| 6,421,198 B1 | 7/2002 | Lamberts et al. |
| 6,462,896 B1 | 10/2002 | Codilian et al. |
| 6,476,996 B1 | 11/2002 | Ryan |
| 6,484,577 B1 | 11/2002 | Bennett |
| 6,493,169 B1 | 12/2002 | Ferris et al. |
| 6,496,324 B1 | 12/2002 | Golowka et al. |
| 6,498,698 B1 | 12/2002 | Golowka et al. |
| 6,507,450 B1 | 1/2003 | Elliott |
| 6,534,936 B2 | 3/2003 | Messenger et al. |
| 6,538,839 B1 | 3/2003 | Ryan |
| 6,545,835 B1 | 4/2003 | Codilian et al. |
| 6,549,359 B1 | 4/2003 | Bennett et al. |
| 6,549,361 B1 | 4/2003 | Bennett et al. |
| 6,560,056 B1 | 5/2003 | Ryan |
| 6,568,268 B1 | 5/2003 | Bennett |
| 6,574,062 B1 | 6/2003 | Bennett et al. |
| 6,577,465 B1 | 6/2003 | Bennett et al. |
| 6,614,615 B1 | 9/2003 | Ju et al. |
| 6,614,618 B1 | 9/2003 | Sheh et al. |
| 6,636,377 B1 | 10/2003 | Yu et al. |
| 6,687,080 B2 * | 2/2004 | Smith ............... G11B 5/59683 360/77.08 |
| 6,690,536 B1 | 2/2004 | Ryan |
| 6,693,764 B1 | 2/2004 | Sheh et al. |
| 6,707,635 B1 | 3/2004 | Codilian et al. |
| 6,710,953 B1 | 3/2004 | Vallis et al. |
| 6,710,966 B1 | 3/2004 | Codilian et al. |
| 6,714,371 B1 | 3/2004 | Codilian |
| 6,714,372 B1 | 3/2004 | Codilian et al. |
| 6,724,564 B1 | 4/2004 | Codilian et al. |
| 6,731,450 B1 | 5/2004 | Codilian et al. |
| 6,735,041 B1 | 5/2004 | Codilian et al. |
| 6,738,220 B1 | 5/2004 | Codilian |
| 6,747,837 B1 | 6/2004 | Bennett |
| 6,754,025 B1 | 6/2004 | Shepherd et al. |
| 6,760,186 B1 | 7/2004 | Codilian et al. |
| 6,768,606 B2 | 7/2004 | Helms |
| 6,788,483 B1 | 9/2004 | Ferris et al. |
| 6,791,785 B1 | 9/2004 | Messenger et al. |
| 6,795,268 B1 | 9/2004 | Ryan |
| 6,819,518 B1 | 11/2004 | Melkote et al. |
| 6,826,006 B1 | 11/2004 | Melkote et al. |
| 6,826,007 B1 | 11/2004 | Patton, III |
| 6,847,502 B1 | 1/2005 | Codilian |
| 6,850,383 B1 | 2/2005 | Bennett |
| 6,850,384 B1 | 2/2005 | Bennett |
| 6,867,944 B1 | 3/2005 | Ryan |
| 6,876,508 B1 | 4/2005 | Patton, III et al. |
| 6,882,496 B1 | 4/2005 | Codilian et al. |
| 6,885,514 B1 | 4/2005 | Codilian et al. |
| 6,900,958 B1 | 5/2005 | Yi et al. |
| 6,900,959 B1 | 5/2005 | Gardner et al. |
| 6,903,897 B1 | 6/2005 | Wang et al. |
| 6,914,740 B1 | 7/2005 | Tu et al. |
| 6,914,743 B1 | 7/2005 | Narayana et al. |
| 6,920,004 B1 | 7/2005 | Codilian et al. |
| 6,924,959 B1 | 8/2005 | Melkote et al. |
| 6,924,960 B1 | 8/2005 | Melkote et al. |
| 6,924,961 B1 | 8/2005 | Melkote et al. |
| 6,934,114 B1 | 8/2005 | Codilian et al. |
| 6,934,135 B1 | 8/2005 | Ryan |
| 6,937,420 B1 | 8/2005 | McNab et al. |
| 6,937,423 B1 | 8/2005 | Ngo et al. |
| 6,952,322 B1 | 10/2005 | Codilian et al. |
| 6,954,324 B1 | 10/2005 | Tu et al. |
| 6,958,881 B1 | 10/2005 | Codilian et al. |
| 6,963,465 B1 | 11/2005 | Melkote et al. |
| 6,965,488 B1 | 11/2005 | Bennett |
| 6,967,458 B1 | 11/2005 | Bennett et al. |
| 6,967,811 B1 | 11/2005 | Codilian et al. |
| 6,970,319 B1 | 11/2005 | Bennett et al. |
| 6,972,539 B1 | 12/2005 | Codilian et al. |
| 6,972,540 B1 | 12/2005 | Wang et al. |
| 6,972,922 B1 | 12/2005 | Subrahmanyam et al. |
| 6,975,480 B1 | 12/2005 | Codilian et al. |
| 6,977,789 B1 | 12/2005 | Cloke |
| 6,980,389 B1 | 12/2005 | Kupferman |
| 6,987,636 B1 | 1/2006 | Chue et al. |
| 6,987,639 B1 | 1/2006 | Yu |
| 6,989,954 B1 | 1/2006 | Lee et al. |
| 6,992,848 B1 | 1/2006 | Agarwal et al. |
| 6,992,851 B1 | 1/2006 | Cloke |
| 6,992,852 B1 | 1/2006 | Ying et al. |
| 6,995,941 B1 | 2/2006 | Miyamura et al. |
| 6,999,263 B1 | 2/2006 | Melkote et al. |
| 6,999,267 B1 | 2/2006 | Melkote et al. |
| 7,006,320 B1 | 2/2006 | Bennett et al. |
| 7,016,134 B1 | 3/2006 | Agarwal et al. |
| 7,023,637 B1 | 4/2006 | Kupferman |
| 7,023,640 B1 | 4/2006 | Codilian et al. |
| 7,027,256 B1 | 4/2006 | Subrahmanyam et al. |
| 7,027,257 B1 | 4/2006 | Kupferman |
| 7,035,026 B2 | 4/2006 | Codilian et al. |
| 7,046,472 B1 | 5/2006 | Melkote et al. |
| 7,050,249 B1 | 5/2006 | Chue et al. |
| 7,050,254 B1 | 5/2006 | Yu et al. |
| 7,050,258 B1 | 5/2006 | Codilian |
| 7,054,098 B1 | 5/2006 | Yu et al. |
| 7,061,714 B1 | 6/2006 | Yu |
| 7,064,918 B1 | 6/2006 | Codilian et al. |
| 7,068,451 B1 | 6/2006 | Wang et al. |
| 7,068,459 B1 | 6/2006 | Cloke et al. |
| 7,068,461 B1 | 6/2006 | Chue et al. |
| 7,068,463 B1 | 6/2006 | Ji et al. |
| 7,088,547 B1 | 8/2006 | Wang et al. |
| 7,095,579 B1 | 8/2006 | Ryan et al. |
| 7,110,208 B1 | 9/2006 | Miyamura et al. |
| 7,110,214 B1 | 9/2006 | Tu et al. |
| 7,113,362 B1 | 9/2006 | Lee et al. |
| 7,113,365 B1 | 9/2006 | Ryan et al. |
| 7,116,505 B1 | 10/2006 | Kupferman |
| 7,126,781 B1 | 10/2006 | Bennett |
| 7,158,329 B1 | 1/2007 | Ryan |
| 7,180,703 B1 | 2/2007 | Subrahmanyam et al. |
| 7,184,230 B1 | 2/2007 | Chue et al. |
| 7,196,864 B1 | 3/2007 | Yi et al. |
| 7,199,966 B1 | 4/2007 | Tu et al. |
| 7,203,021 B1 | 4/2007 | Ryan et al. |
| 7,209,321 B1 | 4/2007 | Bennett |
| 7,212,364 B1 | 5/2007 | Lee |
| 7,212,374 B1 | 5/2007 | Wang et al |
| 7,215,504 B1 | 5/2007 | Bennett |
| 7,224,546 B1 | 5/2007 | Orakcilar et al. |
| 7,248,426 B1 | 7/2007 | Weerasooriya et al. |
| 7,251,098 B1 | 7/2007 | Wang et al. |
| 7,253,582 B1 | 8/2007 | Ding et al. |
| 7,253,989 B1 | 8/2007 | Lau et al. |
| 7,265,933 B1 | 9/2007 | Phan et al. |
| 7,289,288 B1 | 10/2007 | Tu |
| 7,298,574 B1 | 11/2007 | Melkote et al. |
| 7,301,717 B1 | 11/2007 | Lee et al. |
| 7,304,819 B1 | 12/2007 | Melkote et al. |
| 7,330,019 B1 | 2/2008 | Bennett |
| 7,330,327 B1 | 2/2008 | Chue et al. |
| 7,333,280 B1 | 2/2008 | Lifchits et al. |

(56) References Cited

U.S. PATENT DOCUMENTS

| | | |
|---|---|---|
| 7,333,290 B1 | 2/2008 | Kupferman |
| 7,339,761 B1 | 3/2008 | Tu et al. |
| 7,365,932 B1 | 4/2008 | Bennett |
| 7,388,728 B1 | 6/2008 | Chen et al. |
| 7,391,583 B1 | 6/2008 | Sheh et al. |
| 7,391,584 B1 | 6/2008 | Sheh et al. |
| 7,430,082 B2 | 9/2008 | Heydari et al. |
| 7,433,143 B1 | 10/2008 | Ying et al. |
| 7,440,210 B1 | 10/2008 | Lee |
| 7,440,225 B1 | 10/2008 | Chen et al. |
| 7,443,626 B2 * | 10/2008 | Asakura ............... B82Y 10/00 360/48 |
| 7,450,334 B1 | 11/2008 | Wang et al. |
| 7,450,336 B1 | 11/2008 | Wang et al. |
| 7,453,661 B1 | 11/2008 | Jang et al. |
| 7,457,071 B1 | 11/2008 | Sheh |
| 7,466,509 B1 | 12/2008 | Chen et al. |
| 7,468,855 B1 | 12/2008 | Weerasooriya et al. |
| 7,477,471 B1 | 1/2009 | Nemshick et al. |
| 7,480,116 B1 | 1/2009 | Bennett |
| 7,489,464 B1 | 2/2009 | McNab et al. |
| 7,492,546 B1 | 2/2009 | Miyamura |
| 7,495,857 B1 | 2/2009 | Bennett |
| 7,499,236 B1 | 3/2009 | Lee et al. |
| 7,502,192 B1 | 3/2009 | Wang et al. |
| 7,502,195 B1 | 3/2009 | Wu et al. |
| 7,502,197 B1 | 3/2009 | Chue |
| 7,505,223 B1 | 3/2009 | McCornack |
| 7,542,225 B1 | 6/2009 | Ding et al. |
| 7,548,392 B1 | 6/2009 | Desai et al. |
| 7,551,390 B1 | 6/2009 | Wang et al. |
| 7,558,016 B1 | 7/2009 | Le et al. |
| 7,573,670 B1 | 8/2009 | Ryan et al. |
| 7,576,941 B1 | 8/2009 | Chen et al. |
| 7,580,212 B1 | 8/2009 | Li et al. |
| 7,583,470 B1 | 9/2009 | Chen et al. |
| 7,595,954 B1 | 9/2009 | Chen et al. |
| 7,602,575 B1 | 10/2009 | Lifchits et al. |
| 7,616,399 B1 | 11/2009 | Chen et al. |
| 7,619,844 B1 | 11/2009 | Bennett |
| 7,626,782 B1 | 12/2009 | Yu et al. |
| 7,630,162 B2 | 12/2009 | Zhao et al. |
| 7,639,447 B1 | 12/2009 | Yu et al. |
| 7,656,604 B1 | 2/2010 | Liang et al. |
| 7,656,607 B1 | 2/2010 | Bennett |
| 7,660,067 B1 | 2/2010 | Ji et al. |
| 7,663,835 B1 | 2/2010 | Yu et al. |
| 7,675,707 B1 | 3/2010 | Liu et al. |
| 7,679,854 B1 | 3/2010 | Narayana et al. |
| 7,688,534 B1 | 3/2010 | McCornack |
| 7,688,538 B1 | 3/2010 | Chen et al. |
| 7,688,539 B1 | 3/2010 | Bryant et al. |
| 7,697,233 B1 | 4/2010 | Bennett et al. |
| 7,701,661 B1 | 4/2010 | Bennett |
| 7,710,676 B1 * | 5/2010 | Chue ............... G11B 5/59627 360/48 |
| 7,715,138 B1 | 5/2010 | Kupferman |
| 7,729,079 B1 | 6/2010 | Huber |
| 7,733,189 B1 | 6/2010 | Bennett |
| 7,746,592 B1 * | 6/2010 | Liang .................. G11B 5/596 360/31 |
| 7,746,594 B1 | 6/2010 | Guo et al. |
| 7,746,595 B1 | 6/2010 | Guo et al. |
| 7,760,461 B1 | 7/2010 | Bennett |
| 7,800,853 B1 | 9/2010 | Guo et al. |
| 7,800,856 B1 | 9/2010 | Bennett et al. |
| 7,800,857 B1 | 9/2010 | Calaway et al. |
| 7,839,591 B1 | 11/2010 | Weerasooriya et al. |
| 7,839,595 B1 | 11/2010 | Chue et al. |
| 7,839,600 B1 | 11/2010 | Babinski et al. |
| 7,843,662 B1 | 11/2010 | Weerasooriya et al. |
| 7,852,588 B1 | 12/2010 | Ferris et al. |
| 7,852,592 B1 | 12/2010 | Liang et al. |
| 7,864,481 B1 | 1/2011 | Kon et al. |
| 7,864,482 B1 | 1/2011 | Babinski et al. |
| 7,869,155 B1 | 1/2011 | Wong |
| 7,876,522 B1 | 1/2011 | Calaway et al. |
| 7,876,523 B1 | 1/2011 | Panyavoravaj et al. |
| 7,898,762 B1 * | 3/2011 | Guo .................. G11B 5/59688 360/31 |
| 7,916,415 B1 * | 3/2011 | Chue ................. G11B 5/59688 360/48 |
| 7,916,416 B1 | 3/2011 | Guo et al. |
| 7,916,420 B1 | 3/2011 | McFadyen et al. |
| 7,916,422 B1 | 3/2011 | Guo et al. |
| 7,929,238 B1 | 4/2011 | Vasquez |
| 7,961,422 B1 | 6/2011 | Chen et al. |
| 8,000,053 B1 | 8/2011 | Anderson |
| 8,031,423 B1 | 10/2011 | Tsai et al. |
| 8,054,022 B1 | 11/2011 | Ryan et al. |
| 8,059,357 B1 | 11/2011 | Knigge et al. |
| 8,059,360 B1 | 11/2011 | Melkote et al. |
| 8,072,703 B1 | 12/2011 | Calaway et al. |
| 8,077,428 B1 | 12/2011 | Chen et al. |
| 8,078,901 B1 | 12/2011 | Meyer et al. |
| 8,081,395 B1 | 12/2011 | Ferris |
| 8,085,020 B1 | 12/2011 | Bennett |
| 8,116,023 B1 | 2/2012 | Kupferman |
| 8,145,934 B1 | 3/2012 | Ferris et al. |
| 8,179,626 B1 | 5/2012 | Ryan et al. |
| 8,189,286 B1 | 5/2012 | Chen et al. |
| 8,213,106 B1 | 7/2012 | Guo et al. |
| 8,254,222 B1 | 8/2012 | Tang |
| 8,300,348 B1 | 10/2012 | Liu et al. |
| 8,315,005 B1 | 11/2012 | Zou et al. |
| 8,320,069 B1 | 11/2012 | Knigge et al. |
| 8,339,722 B1 * | 12/2012 | Wu .................... G11B 5/59688 360/46 |
| 8,351,174 B1 | 1/2013 | Gardner et al. |
| 8,358,114 B1 | 1/2013 | Ferris et al. |
| 8,358,145 B1 | 1/2013 | Ferris et al. |
| 8,390,367 B1 | 3/2013 | Bennett |
| 8,432,031 B1 | 4/2013 | Agness et al. |
| 8,432,629 B1 | 4/2013 | Rigney et al. |
| 8,451,697 B1 | 5/2013 | Rigney et al. |
| 8,482,873 B1 | 7/2013 | Chue et al. |
| 8,498,076 B1 | 7/2013 | Sheh et al. |
| 8,498,172 B1 | 7/2013 | Patton, III et al. |
| 8,508,881 B1 | 8/2013 | Babinski et al. |
| 8,531,798 B1 | 9/2013 | Xi et al. |
| 8,537,486 B2 | 9/2013 | Liang et al. |
| 8,542,455 B2 | 9/2013 | Huang et al. |
| 8,553,351 B1 | 10/2013 | Narayana et al. |
| 8,564,899 B2 | 10/2013 | Lou et al. |
| 8,576,506 B1 | 11/2013 | Wang et al. |
| 8,605,382 B1 | 12/2013 | Mallary et al. |
| 8,605,384 B1 | 12/2013 | Liu et al. |
| 8,610,391 B1 | 12/2013 | Yang et al. |
| 8,611,040 B1 | 12/2013 | Xi et al. |
| 8,619,385 B1 | 12/2013 | Guo et al. |
| 8,630,054 B2 | 1/2014 | Bennett et al. |
| 8,630,059 B1 | 1/2014 | Chen et al. |
| 8,634,154 B1 | 1/2014 | Rigney et al. |
| 8,634,283 B1 | 1/2014 | Rigney et al. |
| 8,643,976 B1 | 2/2014 | Wang et al. |
| 8,649,121 B1 | 2/2014 | Smith et al. |
| 8,654,466 B1 | 2/2014 | McFadyen |
| 8,654,467 B1 | 2/2014 | Wong et al. |
| 8,665,546 B1 | 3/2014 | Zhao et al. |
| 8,665,551 B1 | 3/2014 | Rigney et al. |
| 8,670,206 B1 | 3/2014 | Liang et al. |
| 8,687,312 B1 | 4/2014 | Liang |
| 8,693,123 B1 | 4/2014 | Guo et al. |
| 8,693,134 B1 | 4/2014 | Xi et al. |
| 8,699,173 B1 | 4/2014 | Kang et al. |
| 8,711,027 B1 | 4/2014 | Bennett |
| 8,717,696 B1 | 5/2014 | Ryan et al. |
| 8,717,699 B1 | 5/2014 | Ferris |
| 8,717,704 B1 | 5/2014 | Yu et al. |
| 8,724,245 B1 | 5/2014 | Smith et al. |
| 8,724,253 B1 | 5/2014 | Liang et al. |
| 8,724,524 B2 | 5/2014 | Urabe et al. |
| 8,737,008 B1 | 5/2014 | Watanabe et al. |
| 8,737,013 B2 | 5/2014 | Zhou et al. |

(56) References Cited

U.S. PATENT DOCUMENTS

| | | | |
|---|---|---|---|
| 8,743,495 | B1 | 6/2014 | Chen et al. |
| 8,743,503 | B1 | 6/2014 | Tang et al. |
| 8,743,504 | B1 | 6/2014 | Bryant et al. |
| 8,749,904 | B1 | 6/2014 | Liang et al. |
| 8,760,796 | B1 | 6/2014 | Lou et al. |
| 8,767,332 | B1 | 7/2014 | Chahwan et al. |
| 8,767,343 | B1 | 7/2014 | Helmick et al. |
| 8,767,354 | B1 | 7/2014 | Ferris et al. |
| 8,773,787 | B1 | 7/2014 | Beker |
| 8,779,574 | B1 | 7/2014 | Agness et al. |
| 8,780,473 | B1 | 7/2014 | Zhao et al. |
| 8,780,477 | B1 | 7/2014 | Guo et al. |
| 8,780,479 | B1 | 7/2014 | Helmick et al. |
| 8,780,489 | B1 | 7/2014 | Gayaka et al. |
| 8,792,202 | B1 | 7/2014 | Wan et al. |
| 8,797,664 | B1 | 8/2014 | Guo et al. |
| 8,804,267 | B2 | 8/2014 | Huang et al. |
| 8,824,081 | B1 | 9/2014 | Guo et al. |
| 8,824,262 | B1 | 9/2014 | Liu et al. |
| 2004/0228234 | A1* | 11/2004 | Tateishi ............ G11B 7/08523 369/44.29 |
| 2010/0035085 | A1 | 2/2010 | Jung et al. |
| 2010/0128386 | A1 | 5/2010 | Keizer et al. |
| 2012/0284493 | A1 | 11/2012 | Lou et al. |
| 2013/0120870 | A1 | 5/2013 | Zhou et al. |
| 2013/0148240 | A1 | 6/2013 | Ferris et al. |

* cited by examiner

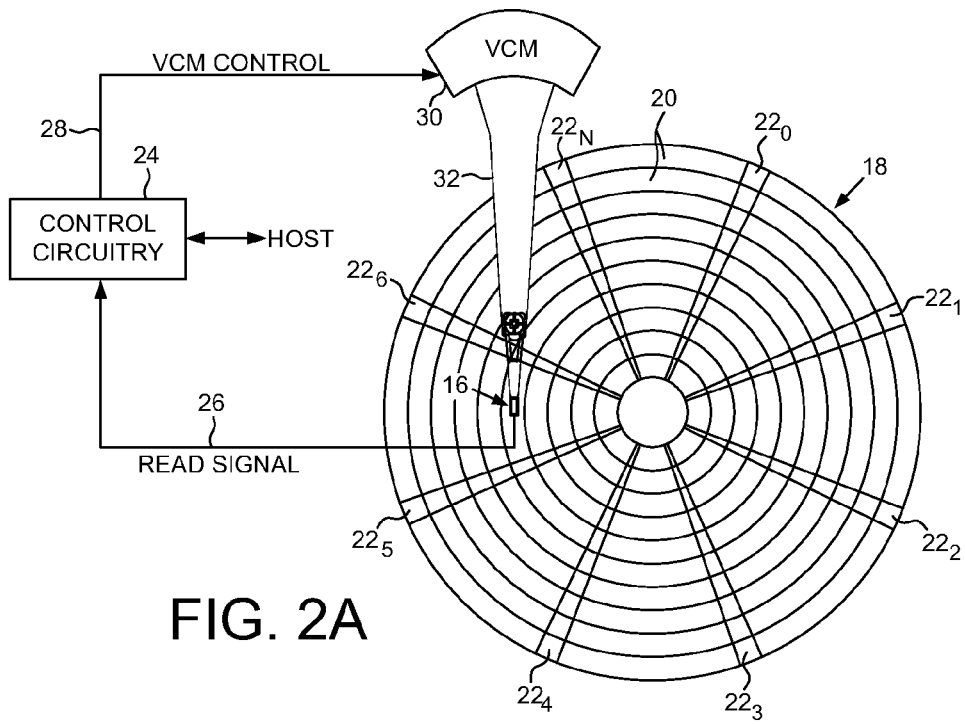
FIG. 2A
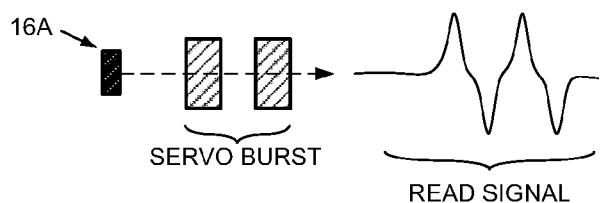
FIG. 2B
$$y_{N_i} = \sum_{k=0}^{N_i} r(kT_s) \cdot \sin(\omega kT_s); \quad i = 0,1,\ldots,M-1$$
FIG. 2C

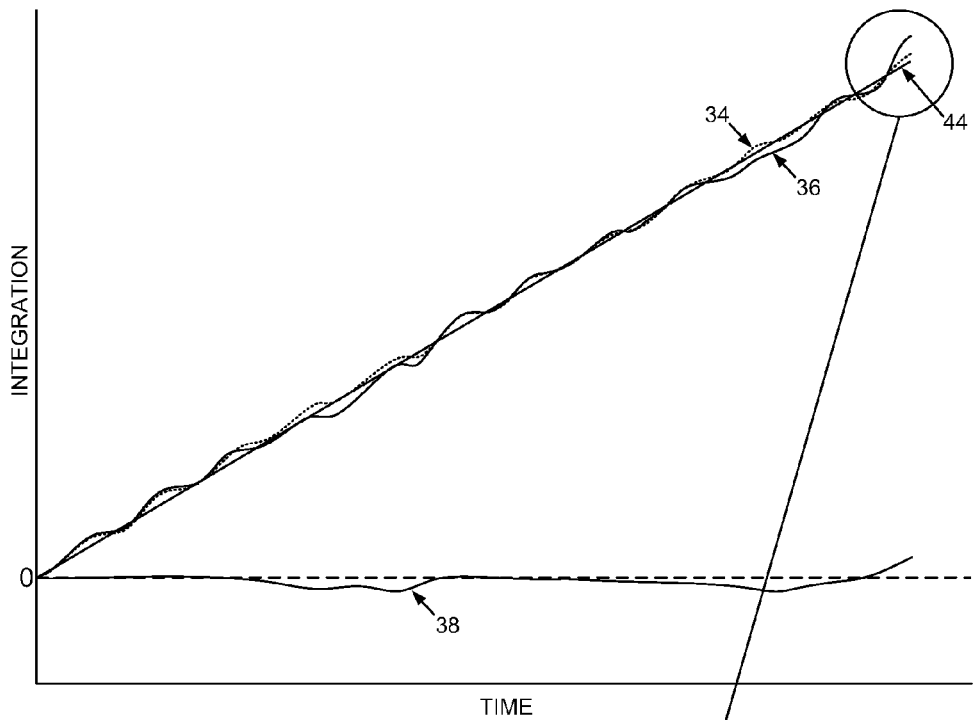
FIG. 3A
FIG. 3B
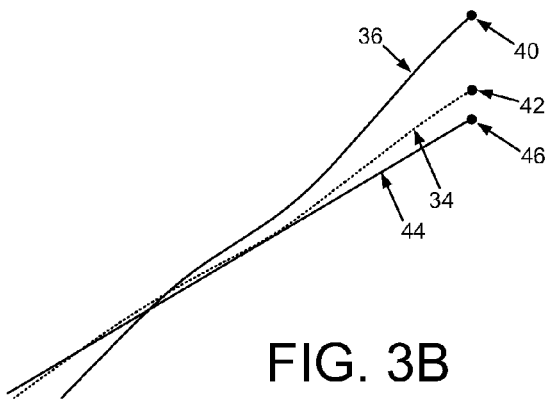
FIG. 3C
FIG. 3D

DATA STORAGE DEVICE DEMODULATING SERVO BURST BY COMPUTING SLOPE OF INTERMEDIATE INTEGRATION POINTS

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

BRIEF DESCRIPTION OF THE DRAWINGS

FIG. 2A is a data storage device in the form of a disk drive comprising a head actuated over a disk.

FIG. 2B shows a read element reading a servo burst of a servo sector, wherein the servo burst comprises a periodic pattern resulting in a periodic read signal according to an embodiment.

FIG. 2C is an equation according to an embodiment for computing M intermediate integration points $y_{N_i}$ based on signal samples of the periodic read signal.

FIGS. 3A-3D show a comparison between an ideal integration of all of the signal samples when demodulating a servo burst, an error caused by non-harmonic distortions in the read signal, and attenuation of the error using the equation of FIG. 2C.

DETAILED DESCRIPTION OF EMBODIMENTS OF THE INVENTION

Figure 1:
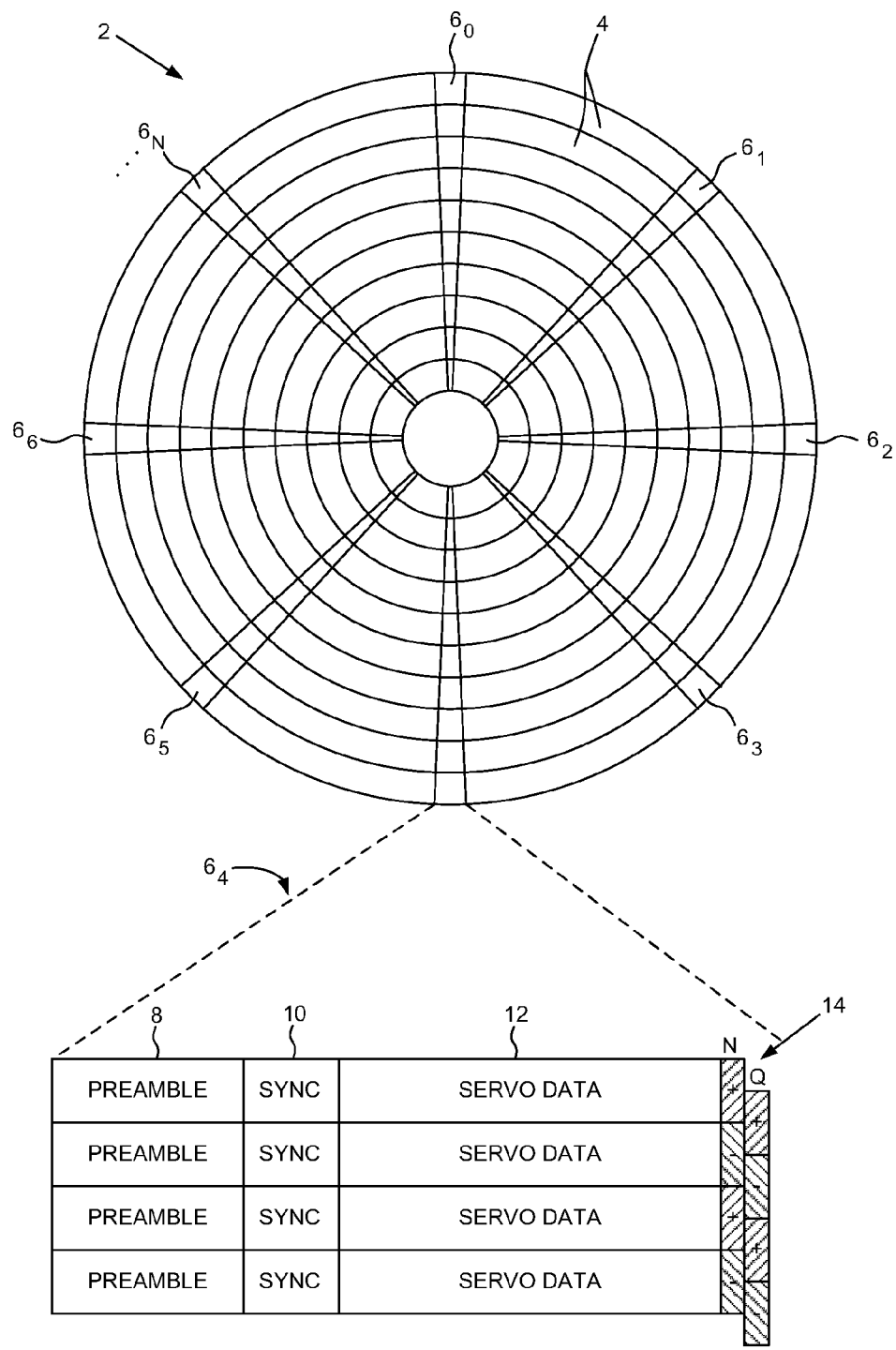
FIG. 1 shows a prior art disk format comprising servo tracks defined by servo sectors.

FIG. 2A shows a data storage device in the form of a disk drive according to an embodiment comprising a head 16 actuated over a disk surface 18 comprising tracks 20 defined by servo sectors $22_0$-$22_N$, wherein each servo sector comprises at least one servo burst comprising a periodic pattern. The disk drive further comprises control circuitry 24 configured to read the servo burst of one of the servo sectors to generate a read signal 26 (FIG. 2B) and compute M intermediate integration points $y_{N_i}$ according to FIG. 2C:

$$y_{N_i} = \sum_{k=0}^{N_i} r(kT_s) \cdot \sin(\omega k T_s); \; i = 0, 1, \ldots, M-1 \quad \text{Eq. (1)}$$

where $r(kT_s)$ represents a sample point of the read signal, $T_s$ represents a sample interval between the sample points, and $\omega$ represents a frequency of the periodic pattern in the servo burst. In one embodiment, the intermediate integration points $y_{N_i}$ may be computed at each sample point of the read signal, and in another embodiment, the intermediate integration points $y_{N_i}$ may be computed at a subset of the sample points. Accordingly, the intermediate integration points $y_{N_i}$ may be generated at various timestamps across the sequence of read signal samples as described in greater detail below.

In one embodiment, the control circuitry 24 process the intermediate integration points $y_{N_i}$ in Eq. (1) to demodulate the servo sector when generating a position error signal (PES) representing the position of the head 16 over the disk surface 18 relative to a target track. The control circuitry 24 may filter the PES using a suitable servo compensator to generate a control signal 28 applied to an actuator, such as a voice coil motor (VCM) 30 that rotates an actuator arm 32 about a pivot in order to actuate the head 16 radially over the disk surface 18.

In the embodiment of FIG. 2B, the servo burst of a servo sector comprises a periodic pattern formed by writing a plurality of consecutive magnetic transitions at a target frequency. When the read element 16A of the head 16 passes over the magnetic transitions, the resulting read signal 26 may ideally be represented as:

$$r(t) = \sum_{n=0}^{\infty} a_n \cdot \sin(n\omega t) \quad \text{Eq. (2)}$$

where $a_n$ represent coefficients of the fundamental frequency ($a_1$) as well as harmonic frequencies of the read signal. In reality, the actual read signal generated by reading a servo burst may comprise non-harmonic distortions as well as random noise and therefore may be represented as:

$$r(t) = \sum_{n=0}^{+\infty} a_n \sin(n\omega t) + \sum_{l=0}^{+\infty} a_{m_l} \sin(m_l \omega t + \phi_{m_l}) + n(t) \quad \text{Eq. (3)}$$

where $a_{m_l}$ represents coefficients of the non-harmonic frequencies of the read signal ($m_l$ is not an integer) and $n(t)$ represents the random noise in the read signal.

A conventional method for demodulating the read signal of a servo burst to generate the position signal is to compute a discrete Fourier transform (DFT) of the read signal over all $N_c$ cycles of the periodic pattern in order to estimate the amplitude of the fundamental frequency $a_1$:

$$y_{N_cT} = \int_0^{N_cT} r(t)\sin(\omega t)dt = \left(\int_0^{N_cT} \left(\sum_{n=0}^{+\infty} a_n\sin(n\omega t)\sin(\omega t)\right)dt + \int_0^{N_cT} \left(\sum_{l=0}^{+\infty} a_{m_l}\sin(m_l\omega t + \varphi_{m_l})\sin(\omega t)\right)dt + \int_0^{N_cT} n(t)\sin(\omega t)dt\right) \quad \text{Eq. (4)}$$

where T equals $2\pi/\omega$. When the integration is computed over all cycles of the periodic signal and when there are an integer number of signal samples per cycle, a trigonometric identity property may be used to reduce the first term in the above Eq. (4) to:

$$\int_0^{N_cT} \left(\sum_{n=0}^{+\infty} a_n\sin(n\omega t)\sin(\omega t)\right)dt = \frac{N_cT}{2}a_1 \quad \text{Eq. (5)}$$

When the second and third terms of the above Eq. (4) are zero, the amplitude of the fundamental frequency can be computed as:

$$a_1 = \frac{2}{N_cT}y_{N_cT} \quad \text{Eq. (6)}$$

If the random noise n(t) is white Gaussian with zero mean then the expected value of the third term in Eq. (4) is zero. However, if the second term is non-zero due to non-harmonic distortions in the read signal it will induce an error into the conventional Eq. (6) when computing the amplitude of the fundamental frequency.

The above Eq. (4) may be represented in discrete-time as:

$$y_{N-1} = \sum_{k=0}^{N-1} r(kT_s)\sin(\omega kT_s) \quad \text{Eq. (7)}$$

where $T_s$ represents the sampling period of the read signal and N represents the total number of sampling points in the read signal over the $N_c$ cycles of the periodic pattern. The conventional method for computing the amplitude of the fundamental frequency using Eq. (6) involves computing the integration of Eq. (7) over all N of the signal samples. However, in an embodiment of the present invention, M intermediate integration points $y_{N_j}$ are computed according to Eq. (1). In one embodiment, an intermediate integration point may be computed at each signal sample of the read signal representing the periodic pattern in the servo burst (i.e., in one embodiment M=N). For example, if in one embodiment the periodic pattern of a servo burst comprises six cycles, and there are eight samples per cycle, then the corresponding intermediate integration points may be represented as $\{(x_0,y_0),(x_1,y_1), \ldots (x_{47},y_{47})\}$ where $x_{N_i}$ represent a timestamp in the sample points of the read signal. Other embodiments may compute the intermediate integration points at a coarser resolution of signal samples, where in one embodiment the integration points are computed at equally spaced timestamps. For example, in one embodiment an intermediate integration point may be computed at the end of each cycle in the above example such that $N_0=7, N_1=15, N_2=23 \ldots N_5=47$.

The intermediate integration points $y_{N_j}$ computed according to Eq. (1) may be used in any suitable manner. In one embodiment, the intermediate integration points $y_{N_j}$ may be processed to compute a more accurate estimate of the amplitude of the fundamental frequency in a manner that attenuates the error due to non-harmonic distortions in the read signal. This embodiment may be understood with reference to FIGS. 3A and 3B which show a first waveform 34 representing the progression of an ideal integration of the signal samples for a read signal without non-harmonic distortion, and a waveform 36 representing the progression of an integration of the signal samples for a read signal with non-harmonic distortion represented by waveform 38. That is, the distorted waveform 36 may be represented as the ideal waveform 34 plus the non-harmonic distortion waveform 38. The last point 40 in the integration of the distorted waveform 36 (FIG. 3B) represents the final integration value computed conventionally according to Eq. 6 which deviates from the final integration value 42 of the ideal waveform 34. In one embodiment, this error is attenuated by computing a slope of a line 44 that passes through the intermediate integration points $y_{N_j}$ described above. That is, the waveform 36 of FIG. 3A may be represented by the intermediate integration points $y_{N_j}$ at predetermined intervals. The resulting intermediate integration points $y_{N_j}$ may be curve fitted to estimate the slope $\alpha$ of the line 44:

$$y = \alpha X \quad \text{Eq. (8)}$$

For example, the slope $\alpha$ of the line 44 may be computed using linear regression as shown in FIG. 3C, from which the amplitude of the fundamental frequency may be computed as shown in FIG. 3D. That is, the amplitude of the fundamental frequency may be computed by multiplying the slope $\alpha$ of the line 44 by the last timestamp $x_{M-1}$ along the x-axis which represents the last point 46 along line 44 in FIG. 3B. Accordingly, the error due to the non-harmonic distortion waveform 38 is reduced since the last point 46 along line 44 is closer to the ideal point 42 (the last point along the ideal waveform 34) than the last point 40 along the distorted waveform 36.

In another embodiment, the intermediate integration points $y_{N_j}$ computed according to Eq. (1) may be used to detect a defect in a servo burst by computing a plurality of local slopes along the line 44. Assume $\alpha(m)$ is a local slope computed from the first m intermediate timestamps, then:

$$\alpha(m) = \frac{\sum_{i=0}^{m-1} x_{N_i} y_{N_i}}{\sum_{i=0}^{m-1} x_{N_i}^2} \quad \text{Eq. (9)}$$

A local slope may be computed at the end of each cycle of the periodic pattern in the servo burst such that a plurality of local slopes $\alpha_j$ may be computed according to:

$$\alpha_j = \frac{\sum_{i=0}^{jN_m-1} x_{N_i} y_{N_i}}{\sum_{i=0}^{jN_m-1} x_{N_i}^2}; j = 1, 2, \ldots, N_c \quad \text{Eq. (10)}$$

where $N_c$ represents a number of cycles in the periodic pattern of the servo burst, and each period comprises $N_m$ intermediate sample points of the read signal. In one embodiment, the local slope $\alpha_j$ may be used to predict the rate of change in the integration between the $j^{th}$ and $(j+1)^{th}$ cycle such that the incremental increment in the integration from the $j^{th}$ and $(j+1)^{th}$ cycle may be computed according to:

$$\alpha_j \cdot N_m \quad \text{Eq. (11)}$$

In one embodiment, the relative error between the predicted integration increment and the actual integration increment from the $j^{th}$ and $(j+1)^{th}$ cycle can be used to detect a defect in the servo burst at either the $1^{st}$ cycle or the $(j+1)^{th}$ cycle. The threshold of relative error may be denoted as $\beta$ which may be statistically determined by analyzing a number of servo bursts with known defects. Therefore, in one embodiment a defect in a servo burst may be detected according to:

$$\frac{\left| \alpha_j \cdot N_m - \left( y_{N_{M_{j+1}}} - y_{N_{M_j}} \right) \right|}{\left| y_{N_{M_{j+1}}} - y_{N_{M_j}} \right|} > \beta \quad \text{Eq. (12)}$$

where $$y_{N_{M_{j+1}}} - y_{N_{M_j}}$$

is the actual integration increment from the $j^{th}$ to $(j+1)^{th}$ cycle.

The above embodiment for detecting a defect in a servo burst may be generalized by considering that a local slope $S_{p,q}$ may be computed according to:

$$S_{p,q} = \frac{\sum_{i=(p-1)N_m}^{qN_m-1} x_{N_i} y_{N_i}}{\sum_{i=(p-1)N_m}^{qN_m-1} x_{N_i}^2} ; 1 \le p \le q \le N_c \quad \text{Eq. (13)}$$

where p represents a beginning of the $p^{th}$ cycle, and q represents an ending of the $q^{th}$ cycle. In one embodiment, a defect may therefore be detected using Eq. (13) based on:

$$\frac{|\alpha_j - S_{j+1,j+1}|}{|S_{j+1,j+1}|} > \beta \quad \text{Eq. (14)}$$

Figure 4A:
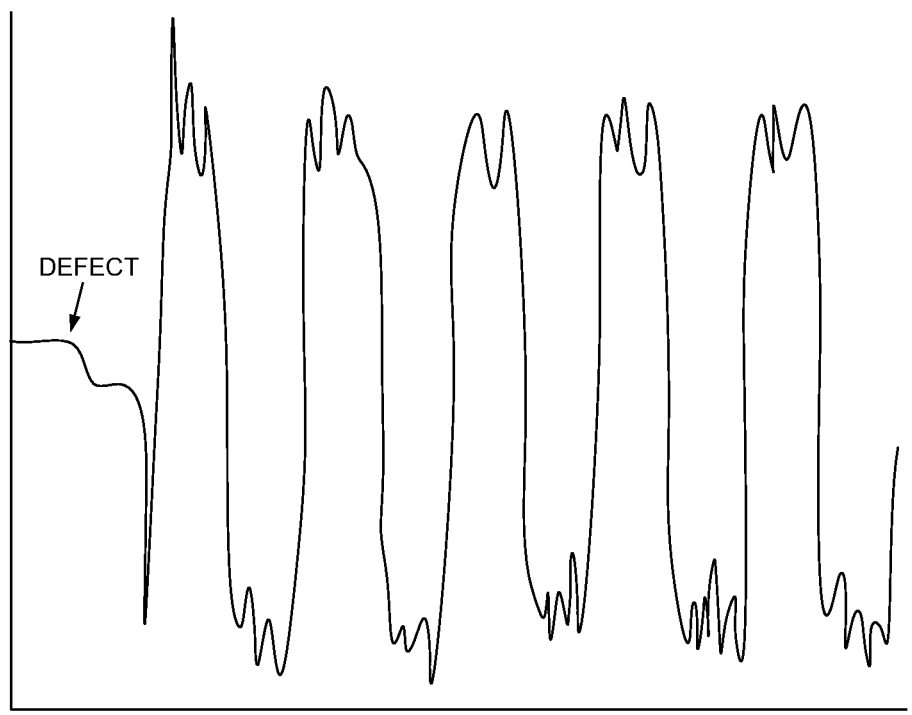
FIG. 4A shows an embodiment wherein a first type of defect in a servo burst is detected when at least the first cycle of the read signal indicates a defect.
Figure 4B:
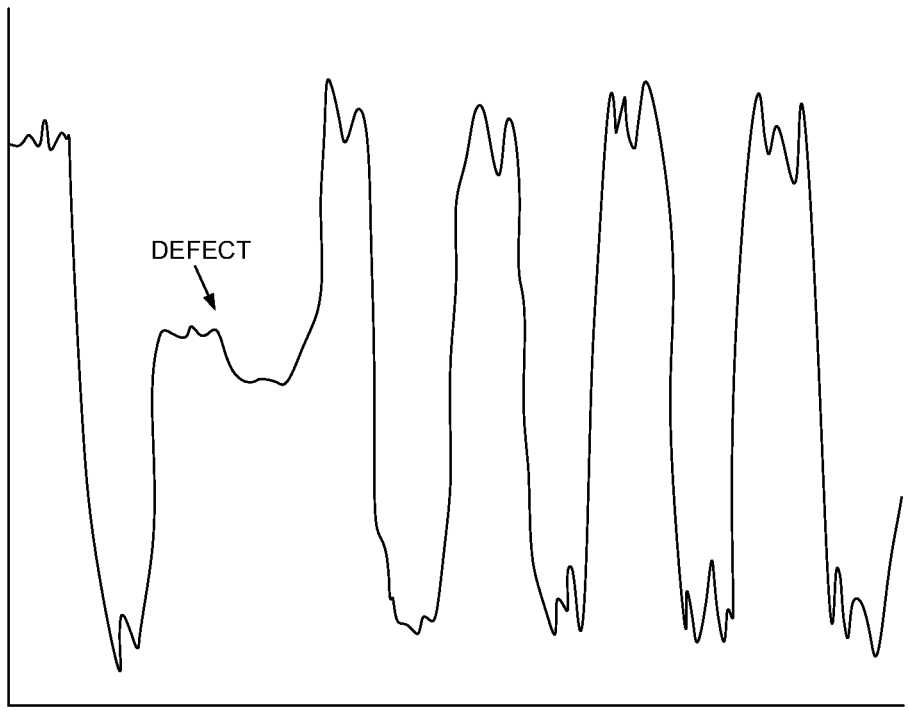
FIG. 4B shows an embodiment wherein a second type of defect in a servo burst is detected when one or more cycles after the first cycle of the read signal indicates a defect.

In one embodiment, the control circuitry 24 may distinguish between types of errors detected in a servo burst based on whether a defect is detected in at least the first cycle of the periodic pattern as illustrated in FIG. 4A, or after the first cycle as illustrated in FIG. 4B. In one embodiment, the control circuitry 24 may track the occurrence of each type of defect which may be subsequently used in any suitable manner, such as by omitting one or more cycles from the servo burst demodulation or improving the servo writing process to reduce the occurrence of certain types of defects.

The embodiments described herein may be modified by manipulating the above mathematics without departing from the scope of the claimed embodiments. For example, the above Eq. (1) may be modified to use a complex value $e^{-j\omega kT_s}$ in place of the real value $\sin(\omega kT_s)$. In addition, one skilled in the art could modify the remaining equations commensurate with using a complex value in Eq. (1) to achieve the above-described benefits, such as computing a more accurate estimate of the fundamental frequency and/or detecting defects in the servo bursts.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

In various embodiments, a disk drive may include a magnetic disk drive, an optical disk drive, etc. In addition, while the above examples concern a disk drive, the various embodiments are not limited to a disk drive and can be applied to other data storage devices and systems, such as magnetic tape drives, solid state drives, hybrid drives, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
   a disk surface comprising tracks defined by servo sectors, wherein each servo sector comprises at least one servo burst comprising a periodic pattern;
   a head actuated over the disk surface; and
   control circuitry configured to:
   read the servo burst of one of the servo sectors to generate a read signal; and
   compute M intermediate integration points $y_{N_i}$ according to:

$$y_{N_i} = \sum_{k=0}^{N_i} r(kT_s) \cdot \sin(\omega kT_s); i = 0, 1, \ldots, M-1$$

where:
   $r(kT_s)$ represents a sample point of the read signal;
   $T_s$ represents a sample interval between the sample points; and
   $\omega$ represents a frequency of the periodic pattern in the servo burst.

2. The data storage device as recited in claim 1, wherein the control circuitry is further configured to compute a slope $\alpha$ of the intermediate integration points according to:

$$\alpha = \frac{\sum_{i=0}^{M-1} x_{N_i} y_{N_i}}{\sum_{i=0}^{M-1} x_{N_i}^2}$$

where $X_{N_i}$ represents a timestamp in the sample points of the read signal.

3. The data storage device as recited in claim 2, wherein the control circuitry is further configured to compute an amplitude of a fundamental frequency $$\frac{1}{T}$$

of the read signal based on:

$$\frac{2}{N_c T} \cdot \alpha \cdot x_{M-1}$$

where:
   $N_c$ represents a number of cycles in the periodic pattern of the servo burst; and
   T equals $2\pi/\omega$.

4. The data storage device as recited in claim 2, wherein the control circuitry is further configured to compute a plurality of local slopes $\alpha_j$ of the intermediate integration points according to:

$$\alpha_j = \frac{\sum_{i=0}^{jN_m-1} x_{N_i} y_{N_i}}{\sum_{i=0}^{jN_m-1} x_{N_i}^2}; j = 1, 2, \ldots, N_c$$

where:
   $N_c$ represents a number of cycles in the periodic pattern of the servo burst; and
   each period comprises $N_m$ intermediate sample points of the read signal.

5. The data storage device as recited in claim 4, wherein the control circuitry is further configured to detect a defect in the servo burst based on the plurality of local slopes $\alpha_j$.

6. The data storage device as recited in claim 5, wherein the control circuitry is further configured to detect a defect in the servo burst based on $\alpha_j \cdot N_m$.

7. The data storage device as recited in claim 6, wherein the control circuitry is further configured to detect a defect in the servo burst based on:

$$\frac{\left|\alpha_j \cdot N_m - \left(y_{N_{M_{j+1}}} - y_{N_{M_j}}\right)\right|}{\left|y_{N_{M_{j+1}}} - y_{N_{M_j}}\right|} > \beta$$

where $\beta$ represents a threshold.

8. The data storage device as recited in claim 4, wherein the control circuitry is further configured to compute a local slope $S_{p,q}$ according to:

$$S_{p,q} = \frac{\sum_{i=(p-1)N_m}^{qN_m-1} x_{N_i} y_{N_i}}{\sum_{i=(p-1)N_m}^{qN_m-1} x_{N_i}^2}; 1 \leq p \leq q \leq N_c$$

where p represents a beginning of the $p^{th}$ cycle, and q represents an ending of the $q^{th}$ cycle.

9. The data storage device as recited in claim 8, wherein the control circuitry is further configured to detect a defect in the servo burst based on:

$$\frac{|\alpha_j - S_{j+1,j+1}|}{|S_{j+1,j+1}|} > \beta$$

where $\beta$ represents a threshold.

10. The data storage device as recited in claim 8, wherein the control circuitry is further configured to detect a first type of defect in the servo burst when the defect is detected in a first cycle of the periodic pattern.

11. The data storage device as recited in claim 10, wherein the control circuitry is further configured to detect a second type of defect in the servo burst when the defect is detected in one of the cycles of the periodic pattern after the first cycle.

12. A method of operating a data storage device, the method comprising:
   reading a periodic pattern in a servo burst of a servo sector on a disk surface to generate a read signal; and
   computing M intermediate integration points $y_{N_i}$ according to:

$$y_{N_i} = \sum_{k=0}^{N_i} r(kT_s) \cdot \sin(\omega kT_s); \, i = 0, 1, \ldots, M-1$$

where:
r($kT_s$) represents a sample point of the read signal;
$T_s$ represents a sample interval between the sample points; and
ω represents a frequency of the periodic pattern in the servo burst.

13. The method as recited in claim 12, further comprising computing a slope LX of the intermediate integration points according to:

$$\alpha = \frac{\sum_{i=0}^{M-1} x_{N_i} y_{N_i}}{\sum_{i=0}^{M-1} x_{N_i}^2}$$

where $X_{N_i}$ represents a timestamp in the sample points of the read signal.

14. The method as recited in claim 13, further comprising computing an amplitude of a fundamental frequency $$\frac{1}{T}$$

of the read signal based on:

$$\frac{2}{N_c T} \cdot \alpha \cdot x_{M-1}$$

where:
$N_c$ represents a number of cycles in the periodic pattern of the servo burst; and
T equals 2π/ω.

15. The method as recited in claim 13, further comprising computing a plurality of local slopes $\alpha_j$ of the intermediate integration points according to:

$$\alpha_j = \frac{\sum_{i=0}^{jN_m-1} x_{N_i} y_{N_i}}{\sum_{i=0}^{jN_m-1} x_{N_i}^2}; \, j = 1, 2, \ldots, N_c$$

where:
$N_c$ represents a number of cycles in the periodic pattern of the servo burst; and
each period comprises $N_m$ intermediate sample points of the read signal.

16. The method as recited in claim 15, further comprising detecting a defect in the servo burst based on the plurality of local slopes $\alpha_j$.

17. The method as recited in claim 16, further comprising detecting a defect in the servo burst based on $\alpha_j \cdot N_m$.

18. The method as recited in claim 17, further comprising detecting a defect in the servo burst based on:

$$\frac{\left|\alpha_j \cdot N_m - \left(y_{N_{M_{j+1}}} - y_{N_{M_j}}\right)\right|}{\left|y_{N_{M_{j+1}}} - y_{N_{M_j}}\right|} > \beta$$

where β represents a threshold.

19. The method as recited in claim 15, further comprising computing a local slope $S_{p,q}$ according to:

$$S_{p,q} = \frac{\sum_{i=(p-1)N_m}^{qN_m-1} x_{N_i} y_{N_i}}{\sum_{i=(p-1)N_m}^{qN_m-1} x_{N_i}^2}; \, 1 \le p \le q \le N_c$$

where p represents a beginning of the $p^{th}$ cycle, and q represents an ending of the $q^{th}$ cycle.

20. The method as recited in claim 19, further comprising detecting a defect in the servo burst based on:

$$\frac{|\alpha_j - S_{j+1,j+1}|}{|S_{j+1,j+1}|} > \beta$$

where β represents a threshold.

21. The method as recited in claim 19, further comprising detecting a first type of defect in the servo burst when the defect is detected in a first cycle of the periodic pattern.

22. The method as recited in claim 21, further comprising detecting a second type of defect in the servo burst when the defect is detected in one of the cycles of the periodic pattern after the first cycle.

\* \* \* \* \*